No. 812,854. PATENTED FEB. 20, 1906.
H. O. LITTLE.
VENEER BENDING MACHINE.
APPLICATION FILED JUNE 21, 1905.
4 SHEETS—SHEET 1.
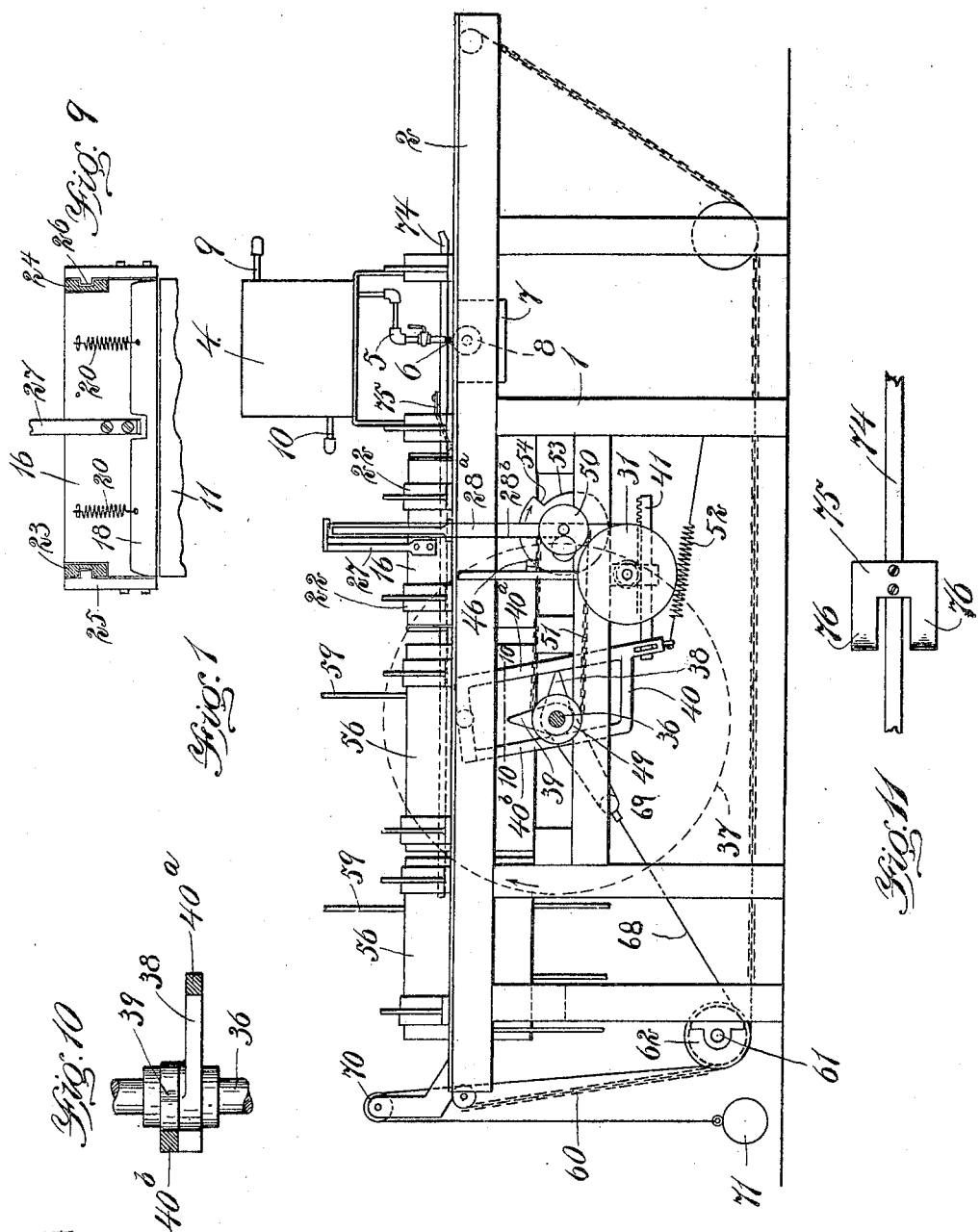
Witnesses:
F. D. Sweet
A. C. Ratigan
Inventor.
H. O. Little
by
Wright Brown Quinby Many
Attorneys.

No. 812,854.
PATENTED FEB. 20, 1906.
H. O. LITTLE.
VENEER BENDING MACHINE.
APPLICATION FILED JUNE 21, 1905.
4 SHEETS—SHEET 2.
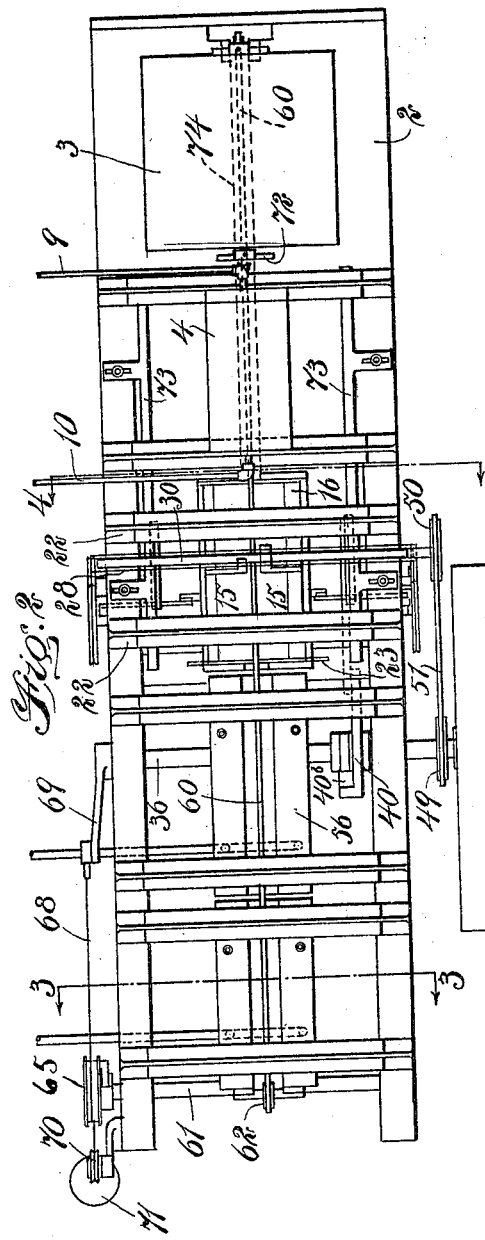
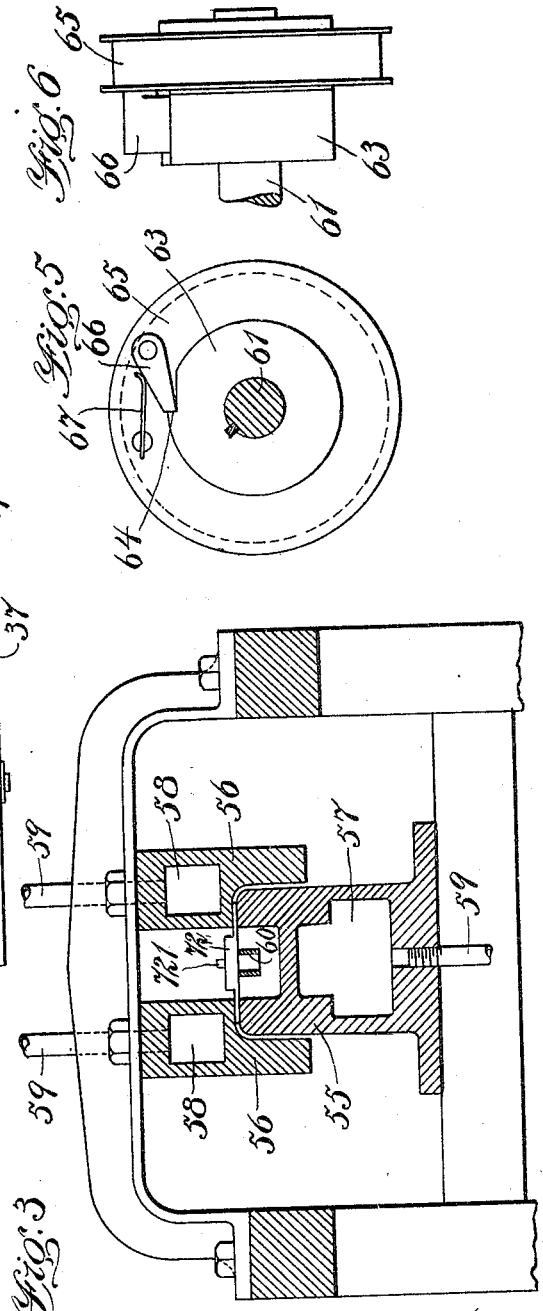
Witnesses:
F. D. Sweet
A. C. Ratigan
Inventor.
H. O. Little.
by
Attorneys

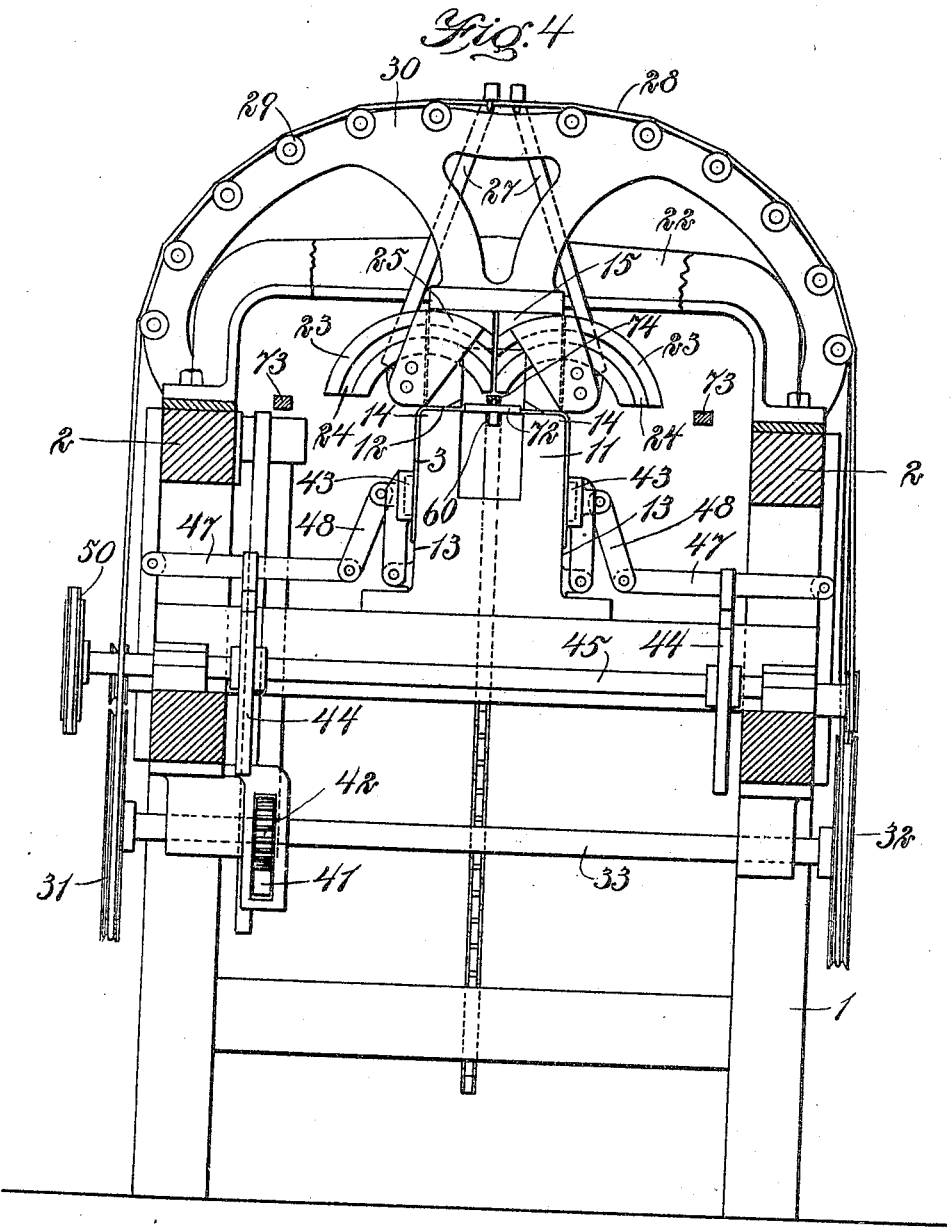

No. 812,854. PATENTED FEB. 20, 1906.
H. O. LITTLE.
VENEER BENDING MACHINE.
APPLICATION FILED JUNE 21, 1905.

4 SHEETS—SHEET 4.

Witnesses:
F. D. Sweet
A. C. Raligan

Inventor:
H. O. Little
by
Attorneys

UNITED STATES PATENT OFFICE.

HENRY OSCAR LITTLE, OF INGERSOLL, CANADA, ASSIGNOR TO THE ONTARIO FRUIT PACKAGE COMPANY, (LIMITED,) OF INGERSOLL, CANADA, A CORPORATION OF CANADA.

VENEER-BENDING MACHINE.

No. 812,854.  Specification of Letters Patent.  Patented Feb. 20, 1906.

Application filed June 21, 1905. Serial No. 266,271.

*To all whom it may concern:*

Be it known that I, HENRY OSCAR LITTLE, of Ingersoll, in the Province of Ontario, Dominion of Canada, have invented certain new and useful Improvements in Veneer-Bending Machines, of which the following is a specification.

The object of the present invention is to bend sheets of wood veneer into such form that they may be assembled in constructing fruit boxes or baskets of the type illustrated in the patent granted to me March 22, 1898, No. 600,920. The box or basket of this patent is constructed of sufficiently heavy veneering to permit of being handled and shipped by itself as a single package without requiring to be inclosed in a stronger box or crate, and in order that it may be strong enough for these purposes it is essential that the veneer should be of equal strength throughout, as well at the bends as at the sides and bottom, and that the fibers should not be cut or broken along the lines on which the bends are made.

It is therefore the object of the present invention to bend blanks of veneer into the form necessary for manufacturing such a basket as that referred to without breaking or tearing away any of the fibers of the wood along the lines of bend and without requiring that the blanks should be scored on such lines.

By my present invention I have produced a machine capable of bending sheets of relatively thick wood veneer into forms suitable for constructing baskets without either breaking the fibers at the bends or requiring that the blanks be scored, and thereby securing as great strength at the corners of the boxes formed by the bends as at all other parts.

This invention is described in the following specification, and illustrated in the accompanying drawings, in which—

Figure 7:
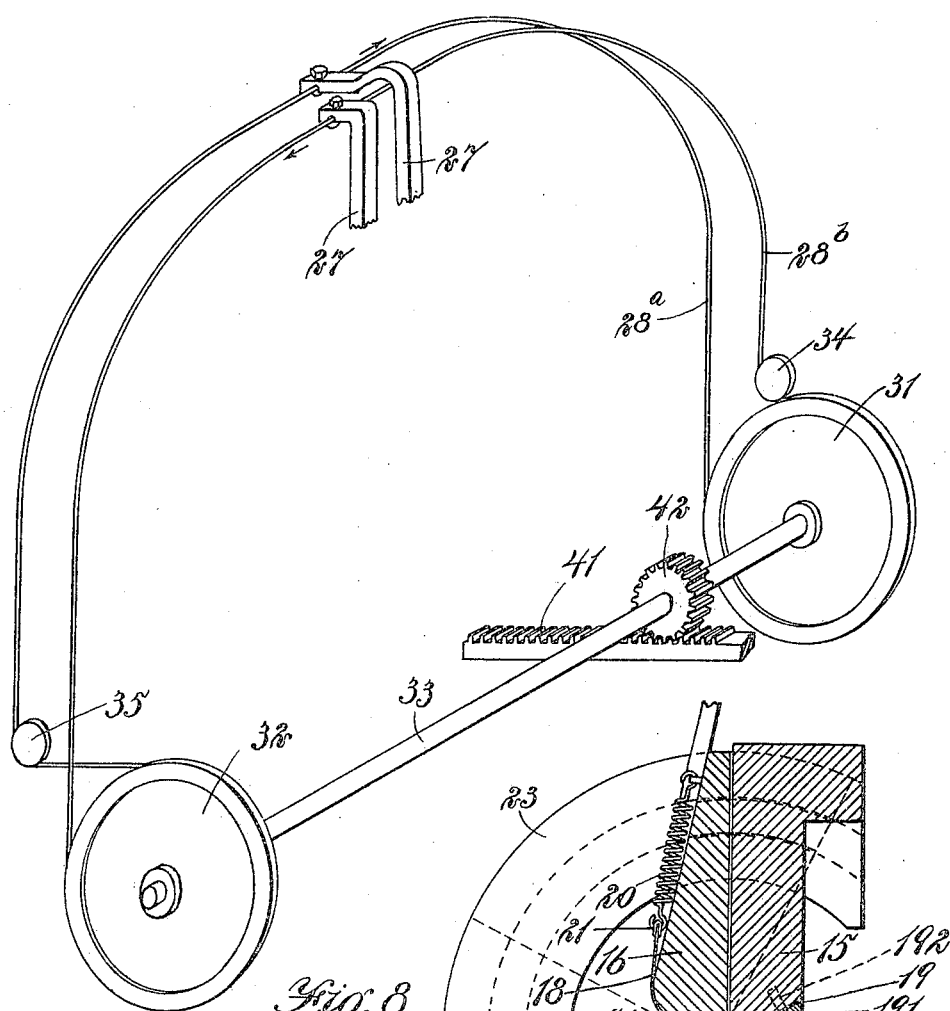
Figure 8:
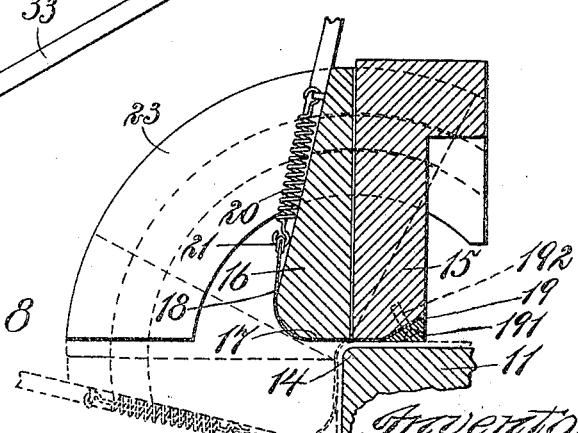

Figure 1 represents a side elevation of a machine embodying the essential principles of my invention. Fig. 2 represents a plan view of the same. Figs. 3 and 4 represent cross-sectional views, taken on lines 3 3 and 4 4, respectively, of Fig. 2, showing parts of the machine somewhat enlarged. Figs. 5 and 6 represent elevations, taken at right angles to each other, of a clutch device by which intermittent motion is given to the means for feeding the blanks into and out of the machine. Fig. 7 represents a perspective view of the driving device for operating the bending means. Fig. 8 represents a sectional detail view, on an enlarged scale, of one of the devices for bending the blanks. Fig. 9 represents a side elevation, partly in section, of the same. Fig. 10 represents a sectional plan view of a portion of the driving mechanism, taken on line 10 10 of Fig. 1. Fig. 11 represents a detail plan view of a guiding member for the blanks.

The same reference characters indicate the same parts in all the figures.

The machine comprises a framework 1, supporting a horizontal table 2, which projects from the front of the machine a sufficient distance clear of all of the mechanism to support a sheet 3 of veneer cut to the proper size for forming a blank. At the forward part of the machine is a tank 4, supported above the table 2, adapted to contain water and having an outlet-pipe 5, terminating in a brush or wick 6, of absorbent material, at substantially the level of the supporting-surface of the table. There are preferably two of these brushes—that is, as many as the bends that are to be made in the blank—and are so located as to moisten the blank fed beneath them along the lines upon which the bends are to take place, making wet paths of width great enough to moisten all of the fibers included in the bent parts. Beneath the table is a second tank 7, containing water and also containing carrying-wheels 8, one being beneath each of the brushes 6 and adapted to moisten the under surface of the blank at the same time that the brushes 6 moisten the upper surface. The water in one or both of these tanks may be heated, so that it will soak more readily into the veneer, and for heating it I have shown pipes 9 10, adapted to convey steam to the tank 4, it being understood that similar pipes may be conducted into the tank 7.

In rear of the moistening devices is a stationary bending form or anvil 11, having a horizontal top surface 12 in the plane of the table and having sides 13, angularly disposed with respect to the surface 12. These sides may be substantially perpendicular to the surface 12, as here shown, or they may be inclined thereto at any angle that may be necessary to give the desired form to the blanks after they have been bent. The surfaces 12 and 13 intersect on lines forming the corners or edges 14 of the anvil, which edges are parallel and are in line with the brushes 6 and moistening-wheels 8, so that as the blank is fed from the moistening devices the lines along which it is wet lie above the corners 14. These corners are preferably rounded to avoid danger of breaking the blanks as they are bent about them. Immediately above the top surface of the anvil are bars 15, having surfaces on their lower portions adjacent and parallel to the anvil and separated from the surface 12 thereof by a distance sufficient to permit insertion of the blank. These parallel surfaces extend outward to the beginning of the curvature of the edges of the anvil. Adjacent the outer sides of the bars 15 are movable benders or bending leaves 16, the lower portions 17 of which extend when in normal position outward from and form continuations of the lower surfaces of the bars 15, and these benders are moved simultaneously outward in paths concentric with the bending edges of the anvil when a blank is in position through an amount sufficient to turn down the end portions of the blank against the sides of the anvil. Fig. 8 shows with the greatest clearness the normal position of one of the benders and shows in dotted lines its position after it has been actuated to bend a portion of a blank. It will be noted from an inspection of the aforesaid figure that as the bender is carried around from its operative to its extreme bending position it is moved away from the stationary bar, leaving between that portion of itself nearest the bar and the bar 15 a space equal in extent to the arc of curvature of the outer portion of the blank at the bend. If the surface 17 of the bender were allowed to come directly in contact with the blank, it would produce a wiping action upon the surface thereof and would have a tendency to pull or tear out the fibers of the wood, which, in addition to the natural tendency of the fibers to separate when sharply bent, would produce the undesirable ragged edge at the bend and weaken the blank. In order to avoid this result, I have provided means for pressing directly and without rubbing action upon the bent portion of the blank, which forms the principal feature of the present invention. This means consists of a sheet or strip 18 of flexible material—such, for instance, as sheet-brass or other tough material—of which one edge is secured to the bar 15, while the rest of the strip is carried outward along the lower surfaces of the bar 15 and bender and around to the outer side of the latter, where it is suitably secured. This strip extends throughout the entire length of the bender and blank, one being applied to each of the two benders. It will be observed that when the bender is moved from its operative to its dotted-line position the sheet 18 is rolled or wrapped about the exterior of the blank and is bent simultaneously with it about the corner 14 of the bending form. As its inner edge 19 is fixed with relation to the form, it cannot slide upon the surface of the blank, but can only act with a direct perpendicular pressure, which results in holding the fibers of the wood firmly against the surface of the blank and effectually preventing their separation while the bending operation is being performed. In order to permit the necessary relative motion between the bender 16 and strip 18 as the bender is carried bodily about the anvil, the strip is secured by yielding means consisting of springs 20, attached to the bender and to the edge 21 of the strip. These springs maintain the strip always in taut and smooth condition, while permitting the bender to move away from the stationary bar without breaking or unduly stretching the strip.

The means for moving the bending-leaves will now be described. Connected to the bars 15, which latter are supported by the cross-bars 22 of the frame, are guide-plates 23, of which there are four, one for each of the benders at each end thereof. These plates have cam-grooves 24, which are substantially concentric with the corners 14 of the bending-frame, and to the ends of each bender are connected plates 25, having projections or ribs 26 extending into the grooves and supporting and guiding the benders. The benders also have actuating-arms 27, which are driven by an endless cord or belt 28 in opposite directions and carry the benders away from and toward each other, the cam-grooves 24 causing them to be moved in the before-mentioned relation with the form 11. The endless element 28, which is preferably a wire cord, is doubled to form parallel stretches or lengths 28$^a$ 28$^b$, which are guided by rolls 29 on an arched frame 30, which also is concentric with the edges 14 14. The arm 27 on one of the benders is connected to one length of the belt, while the other arm 27 is connected to the other stretch. The end portions of the doubled belt pass over pulleys 31 32, secured upon a transverse shaft 33, these end portions forming two loops, one of which is opened and passed over the pulley 31, while the other is crossed and passed about pulley 32, the portions of the cord being suitably held by guide-pulleys 34 35. It will thus be seen that the cord is passed about one of the pulleys in a different direction from that in which it passes about the other pulley, and thus when the shaft and pulleys are rotated together in one direction the two portions of the cord move in opposite directions. The shaft 33 is oscillated first in one and then in the opposite direction by a main drive-shaft 36, which carries a belt-pulley 37, to which power is communicated. This shaft carries cams 38 39, which engage the side bars 40ᵃ 40ᵇ of a pivoted frame 40, which is connected with a rack 41, movable in a straight line, the rack in turn meshing with a pinion 42, fast on shaft 31. It is evident that as shaft 36 is rotated the frame 40 is oscillated, and thereby shaft 33 is also oscillated. In order that the benders may be caused to remain in their inoperative position a sufficient time to permit insertion of a new blank, the cams 38 39 are so arranged that one of them moves the frame 40 in one direction and the other moves it back, and thus by adjusting the cams as much time as may be desired may be caused to elapse between successive actuations of the frame. To permit any adjustment, the cam 38 and bar 40ᵃ are arranged in one vertical plane, while cam 39 and bar 40ᵇ are arranged in a different plane beside the first plane. Thus cam 38 will contact with bar 40ᵃ and slip by the bar 40ᵇ, while cam 39 will act reversely, engaging bar 40ᵇ and passing by beside bar 40ᵃ. After the ends of the blank have been bent around the frame 11 they are engaged and held by clamps 43, which are pivoted adjacent the lower part of the form and are movable toward and away from the sides 13 thereof by cams 44 on a shaft 45, which engage studs 46, carried by levers 47, pivoted to the frame and connected by links 48 with the clamps 43. The cams are driven from shaft 36 by sprockets 49 50 and chain 51 in the direction of the arrow on Fig. 1, and the cams have each a recess 53 and abutment 54. When the abutments strike the studs, they elevate the levers and move the clamps into contact with the ends of the veneer-blank, holding them with a light pressure near the sides of the anvil while the benders are being retracted. While a blank is so held by the clamps it is fed along to a heating and drying form 55, which is of the same outline as the anvil and placed in line therewith. Closely adjacent it are complemental forms 56, which are reversely shaped and located so as to permit a bent blank to be inserted between the parts 55 and 56. These forms are all heated by suitable means, as by steam entering internal chambers 57 58 through pipes 59, and they retain the blank a long enough time until it is practically dry and has become set.

An endless chain 60 running the entire length of the machine feeds the blank from the forward end of the table 2, past the moistening devices into relation with the bending means, and thence after it has been bent to the drier. This feeding element is movable intermittently, being halted a long enough time to permit the bending operation to take place on each blank before it feeds the blank to the drier. It is thus driven from the main shaft 36 by a shaft 61, having a sprocket 62, with which it engages. The shaft 61 carries a clutch consisting of a fast member 63, which is a ratchet-wheel having a tooth 64 and a loose member 65, carrying a pivoted pawl 66, pressed by a spring 67 against the surface of the ratchet 63. The member 65 is formed as a drum, about which a turn of the cord 68 is taken, this cord being attached at one end to a crank 69 on shaft 36, while its other end is carried over a guide-pulley 70 and is yieldingly drawn away from the crank by a weight 71. As the crank-arm 69 is rotated it alternately pulls upon the cord 68, raising the weight, and then slackens the cord, allowing the weight to descend, and so the cord is moved first in one and then in the other direction, thus oscillating the loose drum. As the latter is turned in one direction it has no effect upon the clutch-wheel 63; but when it moves in the other direction the pawl 66 strikes tooth 64 and turns the member 63, moving the shaft and chain 60 by an amount sufficient to feed a bent blank from the bending devices to the drier and a new blank into the bender. The chain carries studs 721, to which are secured feeding projections in the form of cross-bars 72, which are spaced, so as to accommodate the blanks and ride upon the upper surfaces of table 2 and the bending and drying forms. They engage the blanks positively and feed them.

On each side of the machine there are adjustable guides 73, which engage the sides of the blanks and provide for the accurate lateral placing thereof, and there is also a central guide 74 above the table beneath which the blanks pass and which carries a flexible plate 75 with extensions 76, projecting downward toward the table in line with the bars 15, which press out any wrinkles there may be in the blank due to warping.

In applying stock to the machine the blank is placed with its grain extending transversely of the table, so that when it is bent the bending is effected along the grain.

I claim—

1. A machine for bending sheets of veneer comprising a form having edges about which the blanks are to be bent, moistening devices in line with said edges and arranged to engage opposite sides of a blank being fed to the form and moisten the same only on the lines of bend, bending-leaves supported to move in curved paths about the edges, and mechanism for operating said bending-leaves.

2. A machine for bending sheets of veneer comprising a form having edges about which the blanks are to be bent, a table in front of said form arranged to hold a sheet in position to be fed to the form, moistening devices set into the table approximately flush with the supporting-surface thereof and in line with the edges of the form for engaging and moistening the under side of the sheet on the lines of bend as the sheet is fed to the form, moistening devices above the table for wetting the upper side of the sheet on the same lines, bending-leaves supported to move in curved paths about the edges, and mechanism for operating said bending-leaves.

3. A bending-machine comprising a moistening device, a form, a bender arranged to carry a portion of a sheet of stock about the form, a clamp movable toward and from the side of the form, mechanism for moving the clamp toward the form after the bending operation to engage the bent portion of the stock and hold the same beside the form, and drying means adjacent the form constructed to closely confine and hold the stock in the shape given it by the form and to dry the stock while so holding it.

4. A bending-machine comprising a moistening device, a bending-form, a bender arranged to carry a portion of a sheet of stock about the form, a clamp adjacent the form, mechanism for moving said clamp toward the form to engage the bent portion of the stock and hold the same beside the form, a drying-form in line with the bending-form of a shape similar thereto with means for confining and holding the stock in the shape given it by the bending-form, and provisions for heating said drying-form.

5. A veneer-bending machine comprising a fixed form, having a flat surface and an edge, a bending member movable in a curved path about said edge, mechanism for oscillating said bending member in such path to engage and carry a portion of a sheet of veneer about said edge and then release the sheet, a clamp movable toward and from the form, and mechanism for moving said clamp toward the form to hold the bent portion beside the form as the same is released by the bending member.

6. A bending-machine comprising a form having edges, bending members supported and guided to move substantially concentrically about such edges, and means for simultaneously oscillating said bending members in opposite directions comprising an endless flexible driving element arranged with two stretches moving oppositely, each stretch being connected with one of the benders and means for moving said driving element first in one, and then in the opposite direction.

7. In a machine of the character described having bending members, means for operating said members, comprising an oscillatory shaft bearing wheels, and an endless flexible driving element passing over said wheels and guided in parallel stretches in the directions of movement of said members, one stretch being crossed over the other, whereby rotation of the shaft causes the stretches of said element to be moved oppositely, and each stretch being connected to one of the bending members.

8. In a machine of the character described having bending members, means for operating said members, comprising a main driving-shaft movable in one direction, an oscillatory shaft, reciprocatory driving connections between said main and oscillatory shafts for moving the latter first in one and then in the opposite direction, and an endless flexible driving element passing over said wheels and guided in parallel stretches in the directions of movement of said members, one stretch being crossed over the other, whereby rotation of the shaft causes the stretches of said element to be moved oppositely, and each stretch being connected to one of the bending members.

9. In a machine of the character described, a pair of bending members, an endless flexible cord or belt doubled to form two parallel lengths forming loops at their ends passing across the machine, one length being connected to each bending member, a shaft approximately in the same plane with the cord, and pulleys carried by said shaft, one of the loops formed in the cord being opened and passed over one of said pulleys, and the other being crossed and passed over the other pulley, whereby movement of both pulleys in one direction drives the lengths of said cord, and thereby the bending members in opposite directions.

10. A bending-machine comprising bending instrumentalities, a continuous intermittently-movable element constructed to feed stock to said instrumentalities, a shaft engaged with said element for moving the same, a ratchet-wheel fast on said shaft, a drum loose on the shaft, a pawl carried by the drum adapted to engage the ratchet when moved in one direction, a continuously-moving main shaft having a crank, a line connected to the crank passing about the drum, and yielding means for holding said line under tension, and connections from the main shaft arranged to operate said bending instrumentalities.

11. A bending-machine comprising a form, means for bending a blank about the same, a clamp pivoted adjacent a side of the form and movable toward and away from the same, a cam arranged to act on the clamp and move the same into contact with a portion of the blank after it has been bent, and automatic mechanism for operating said cam.

12. A bending-machine comprising a bending-form, having an edge for shaping a blank to be bent, a moistening device in line with said edge, means adjacent the bending-form for bending the blank about the edge of the form, a heated drying-form in line with the bending-form constructed to hold the blank in the shape given it by the bending means, and a continuous element extending by the moistening device and the bending and drying forms for feeding the blank past the moistening device, whereby the blank is moistened on the line of bending, to the bending means and form, and thence to the drying-form.

13. In a machine of the character specified, a drive-shaft, cam members thereon arranged in different planes, a pivoted frame having sides in different planes, each side being arranged to be operated by one only of the cam members, veneer-bending mechanism and connections from said frame for operating said mechanism.

14. A machine for bending veneer comprising a form having edges, guide-plates fixed adjacent the ends of the form and having grooves curved concentrically about said edges, bending members, plates connected to the ends and projecting beyond the sides of said members having ribs extending into said grooves and supporting the bending members, means for moving said members whereby they are carried about the edges of the form and caused to bear upon and bend about such edges the projecting ends of a sheet of veneer laid on the form, and flexible sheets connected at their edges to the bending members and a fixed abutment adjacent the form, one of such connections being yielding.

15. A machine for bending veneer comprising a form having a supporting-surface and sides angularly disposed thereto, divided therefrom by abrupt edges, fixed supports adjacent the supporting-surface of the form, guide-plates connected to the supports and having cam-grooves concentric with the edges of the form, benders having projections extending into said grooves and wholly supported thereby, means for moving the benders, whereby they are caused by said grooves to travel around the edges of the form and to carry thereabout the projecting ends of a sheet of veneer held on the supporting-surface of the form, flexible sheets secured to the supports and carried around portions of the benders, and a plurality of springs connected to the outer edge of each sheet and fixed to the benders.

16. A machine for bending veneer, comprising a form having flat surfaces and dividing edges intermediate the surfaces, bending members movable concentrically about said edges and arranged to engage portions of a blank of veneer and fold the same about the form, holders for engaging and retaining the ends of the blank adjacent the sides of the form while the benders are returned, and automatic mechanism for first operating the benders and then moving the holders toward the sides of the form.

17. A machine for bending veneer, comprising a form having flat surfaces and dividing edges intermediate the surfaces, bending members movable concentrically about said edges and arranged to engage portions of a blank of veneer and fold the same about the form, holders for engaging and retaining the ends of the blank adjacent the sides of the form while the benders are returned, a second form shaped similarly to the first and in alinement therewith, reversely-shaped holders adjacent the second form and separated therefrom by a space of a width and shape substantially identical with that of a bent blank, and provisions for heating said second form and holders.

18. A machine for bending veneer comprising a form having an upper flat supporting-surface, substantially perpendicular sides and dividing edges, supports above the form having under surfaces parallel with the upper surface of the form and extending to the edges thereof, benders normally held by said supports adjacent the outer sides thereof, being greater in an up-and-down direction than laterally and formed with narrow under surfaces extending outward in the same plane with the under surfaces of the supports and with upwardly-extending outer surfaces, flexible metal sheets each secured at one edge to one of said supports and wrapped about the lower and outer sides of one of the benders, springs yieldingly connecting the outer edges of the sheets to the benders, and mechanism for oscillating the benders about the edges of the form to carry the under surfaces of the benders into parallelism with the sides of the form and back to normal position.

19. A machine for bending veneer comprising a form having an upper flat supporting-surface, substantially perpendicular sides and dividing edges, supports above the form having under surfaces parallel with the upper surface of the form and extending to the edges thereof, guide-plates fixed to said supports having grooves curved concentrically with said edges, bending members normally located beside the supports, elongated curved ribs fitting in said grooves and rigidly connected to the ends of said members, constituting the sole supporting means for the benders and causing the same when moved to travel in paths corresponding to said grooves, and means for oscillating said bending members.

20. In a veneer-bending machine, a shaping-form having edges to shape the bends in a sheet of veneer, bending members movable about said edges to carry portions of a sheet of veneer thereabout, holders movable toward and from the sides of the form to engage and hold the ends of the bent sheet, a second form in line with the shaping-form, an endless feeding element extending longitudinally of the machine, a main drive-shaft and connections therefrom for operating the bending members, the holders and the feeding element, arranged to first carry the bending members about the form, then advance the holders toward the form, retract the bending means, and actuate the feeding element to carry the bent sheet from the shaping-form to the second form and to feed a fresh blank to the shaping-form.

21. In a veneer-bending machine, a shaping-form having edges to shape the bends in a sheet of veneer, bending members movable about said edges to carry portions of a sheet of veneer thereabout, holders movable toward and from the sides of the form to engage and hold the ends of the bent sheet, a second form in line with the shaping-form, an endless feeding element extending longitudinally of the machine, a flexible driving element having oppositely-moving portions connected to the respective bending members, a main drive-shaft, cam members rotated by the shaft for moving said driving element back and forth, cams operated by the driving-shaft for moving the holders toward and from the shaping-form, and intermittent mechanism operated by the driving-shaft for moving said feeding element.

In testimony whereof I have affixed my signature in presence of two witnesses.

HENRY OSCAR LITTLE.

Witnesses:
 THO. WELLS,
 ALFRED E. ALDERSON.